(12) United States Patent
Kandar et al.

(10) Patent No.: US 12,509,044 B2
(45) Date of Patent: Dec. 30, 2025

(54) BACKUP SYSTEM FOR AN ELECTRONIC PARKING BRAKE AND A METHOD FOR PROVIDING A BACKUP POWER

(71) Applicant: KNORR-BREMSE Systeme fuer Nutzfahrzeuge GmbH, Munich (DE)

(72) Inventors: Tibor Kandar, Sukoro (DE); Max Michalski, Neubiberg (DE); Peter Gyetvan, Gyal (HU); Adam Kohazi, Szekesfehervar (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 395 days.

(21) Appl. No.: 18/037,006

(22) PCT Filed: Nov. 18, 2021

(86) PCT No.: PCT/EP2021/082096
§ 371 (c)(1),
(2) Date: May 15, 2023

(87) PCT Pub. No.: WO2022/128306
PCT Pub. Date: Jun. 23, 2022

(65) Prior Publication Data
US 2023/0415722 A1 Dec. 28, 2023

(30) Foreign Application Priority Data
Dec. 17, 2020 (EP) .................................... 20214919

(51) Int. Cl.
*B60T 13/66* (2006.01)
*B60T 13/38* (2006.01)
(Continued)

(52) U.S. Cl.
CPC .......... *B60T 13/662* (2013.01); *B60T 13/385* (2013.01); *B60T 17/221* (2013.01); *H02J 7/345* (2013.01); *B60T 2270/402* (2013.01)

(58) Field of Classification Search
CPC .... B60T 13/662; B60T 13/385; B60T 17/221; B60T 2270/402; B60T 13/66;
(Continued)

(56) References Cited

U.S. PATENT DOCUMENTS

2010/0133900 A1   6/2010   King
2014/0326549 A1   11/2014  No
(Continued)

FOREIGN PATENT DOCUMENTS

CN   104129385 A   11/2014
CN   109789868 A   5/2019
(Continued)

OTHER PUBLICATIONS

WO document No. WO 2022024508 to Motofusa et al. published on Feb. 3, 2022.*
(Continued)

*Primary Examiner* — Pamela Rodriguez
(74) *Attorney, Agent, or Firm* — Crowell & Moring LLP

(57) ABSTRACT

A backup system for an electronic parking brake, EPB, of a commercial vehicle ensures a safe state even during electric power failure of a power supply unit of the EPB. The backup system includes a detection unit for detecting the power failure, a storage device for storing sufficient electric power to perform a switch into the safe state, a boost circuit configured to charge the storage device during standstill of the vehicle and to discharge the storage device during motion of the vehicle, and a switch device configured to supply the electric power of the storage device to the EPB if the power failure is detected by the detection unit.

11 Claims, 4 Drawing Sheets

(51) Int. Cl.
*B60T 17/22* (2006.01)
*H02J 7/34* (2006.01)

(58) Field of Classification Search
CPC ....... H02J 7/345; H02J 9/061; B60Y 2306/13; B60Y 2400/81
See application file for complete search history.

(56) References Cited

U.S. PATENT DOCUMENTS

| | | | |
|---|---|---|---|
| 2019/0232902 | A1 | 8/2019 | Teng |
| 2019/0248349 | A1 | 8/2019 | Wulf |
| 2019/0322262 | A1 | 10/2019 | Kearney et al. |
| 2020/0198609 | A1 | 6/2020 | Nemeth et al. |
| 2020/0406879 | A1* | 12/2020 | Hecker ................. B60T 13/683 |
| 2022/0250602 | A1* | 8/2022 | Schnittger ............. B60T 13/683 |

FOREIGN PATENT DOCUMENTS

| | | |
|---|---|---|
| CN | 110386091 A | 10/2019 |
| CN | 110785330 A | 2/2020 |
| CN | 111801254 A | 10/2020 |
| DE | 10 2015 114 176 B3 | 7/2016 |
| EP | 1 518 774 A1 | 3/2005 |
| JP | 2012-5270 A | 1/2012 |
| JP | 2018-52417 A | 4/2018 |
| JP | 2019-30055 A | 2/2019 |
| JP | 2019-83637 A | 5/2019 |

OTHER PUBLICATIONS

International Search Report (PCT/ISA/210) issued in PCT Application No. PCT/EP2021/082096 dated Mar. 1, 2022 (two (2) pages).
Written Opinion (PCT/ISA/237) issued in PCT Application No. PCT/EP2021/082096 dated Mar. 1, 2022 (five (5) pages).
Extended European Search Report issued in European Application No. 20214919.1 dated Jun. 9, 2021 (six (6) pages).
Japanese-language Office Action issued in Japanese Application No. 2023-537083 dated Aug. 7, 2024 with English translation (8 pages).
Chinese-language Office Action issued in Chinese Application No. 202180085313.X dated Jun. 27, 2025 with English translation (16 pages).

* cited by examiner

BACKUP SYSTEM FOR AN ELECTRONIC PARKING BRAKE AND A METHOD FOR PROVIDING A BACKUP POWER

BACKGROUND AND SUMMARY

The present invention relates to a backup system for an electronic parking brake, a method for providing backup power to an electronic parking brake, and, in particular, to a capacitor solution for a so-called greypoint sticking.

A parking brake of commercial vehicles utilizes a bistable pneumatic relay valve that defines two safe end positions: an inflated, un-parked state and a deflated, parked state. The parking brake enables the safe parked state by a spring chamber using a spring to engage the brake even if no power is available. In the un-parked state, the spring chamber is inflated to release the park brake. The second safe state is enabled by a feedback line of output to the control input of the relay valve.

FIG. 4 depicts a conventional electronic parking brake (or better the pneumatic part thereof) of a commercial vehicle with a relay valve 80, an input valve 71 and an output valve 72. Furthermore, a compressed air supply 61 provides pressurized air via a check valve 65 to the relay valve 80 and, in addition, to the input valve 71. The input valve 71 and the output valve 72 control the control input 81 of the relay valve 80, wherein the input valve 71 pressurizes and the output valve 72 exhausts, upon excitation, the control input 81. The input valve 71 and the output valve 72 are solenoid valves controlled by control signals provided by a controller (not shown in FIG. 4). The relay valve 80 is connected to a spring brake chamber at an outlet 84, which is either exhausted through an exhaust 82 (parked state) or is pressurized (drive state) using the pressure line from the check valve 65. These two states are: state 1 and state 4 indicated at the relay valve 80 in FIG. 4. The various pressure values may be monitored by pressure sensors 76.

One safe state of the relay valve 80 is ensured by bias spring resulting in a default (pressure-less) position where the spring brake is exhausted. The second safe state is made stable by linking a control line of the relay valve 80 to the outlet 84 to feed a pneumatic control signal to the control input 81. As a result, if the outlet 84 and the control input 81 stay in the same state (deflated or inflated)—at least as long as the input and output valves 71, 72 are in their default, closed position, even if there is a leakage.

A problem is the so-called greypoint sticking relating to an intermediate position, where it is possible that a balancing force causes the piston of the relay valve 80 to remain in an intermediate position (greypoint) resulting in a pressure that is stationary for some duration. The leakage will finally decide the switching of the piston to one of the safe states. However, this phenomenon can lead to a braking force loss after a certain duration, since the parking brake is not properly engaged. This may become to a problem, if the driver of the commercial vehicle had already left the vehicle, because there is the risk that the commercial vehicle can run-away without the driver in the cabin.

Therefore, there is a demand for a safety mechanism to ensure at any time that the parking brake is able go into the desired safe position.

At least some of the problems of the conventional device as described before are overcome by a system or method according to the claimed invention. The dependent claims refer to further advantageous realizations of the subject matter of the independent claims.

The present invention relates to a backup system for an electronic parking brake, EPB, especially of a commercial vehicle, to ensure a safe state even during electric power failure of a power supply unit of the EPB. The system includes a detection unit for detecting the power failure, a storage device for storing sufficient electric power to perform a switch into the safe state, a boost circuit configured to charge the storage device during standstill of the vehicle and to discharge the storage device during motion of the vehicle, and a switch device configured to supply the electric power of the storage device to the EPB if the power failure is detected by the detection unit.

The standstill can be defined as a motion state of the vehicle, where the speed of the vehicle is below a predefined value being 10 km/h, 7 km/h, 5 km/h or 3 km/h or where the speed is about zero.

Optionally, the EPB includes a control unit, a relay valve and at least one solenoid valve being controlled by the control unit. The at least one solenoid valve may control a pressure in the relay valve. The boost circuit may then be configured to perform one or more of the following:

receiving from the control unit control signals indicating a standstill and/or a motion state of the vehicle, providing a status signal to the control unit indicating a charge status of the storage device, receiving and/or amplifying a power from the power supply unit to charge the storage device (e.g. in less than a second).

The stored electric energy in the storage device may be provided for an actuation of the at least one solenoid valve. The actuated relay valve may, in response to the actuation of the at least one solenoid, inflate or deflate a spring brake chamber to deactivate or active the park brake, resp.

Optionally, the EPB includes a high side switch configured to switch the at least one solenoid. The switch unit may include a backup switch and a control circuit. The backup switch may be configured to open and/or to close a current path from the storage device to the at least one solenoid valve. Thus, it may serve as a backup for the high side switch of the EPB. The control circuit may be configured to control the backup switch and thus the power supply from the storage device to the at least one solenoid valve in case the power failure is detected.

Optionally, the EPB includes a low side switch to switch a connection of the at least one solenoid to ground. The control unit may be configured to control the low side switch by a switch signal. The detection unit may be configured to control the low side switch by a low side switch control signal. The logic circuit may be configured to switch the low-side switch when the control unit provides the switch signal or the detection unit provides the low side switch control signal.

Optionally, the detection unit is configured to provide a high side switch control signal to the switch device to enable or to trigger (e.g. in case of the power failure) switching the backup switch.

Optionally, the system includes a safety power supply unit configured to be charged by the storage device and/or by the boost circuit, and to provide a backup power supply for the detection unit and/or for the switch device.

The at least one solenoid valve may be arranged between a high side node (or high voltage node) and ground. The system may, optionally, include at least one of the following diodes: a first diode configured to provide an overvoltage protection at the high side node, a second diode configured to prevent a back current from the high side node to the high side switch, a third diode configured to prevent a current flow from the backup switch to the storage device. For this, the diode(s) are arranged accordingly so the blocking direction prevents the corresponding electric currents or the breakthrough voltage acts as cut off voltage to limit a voltage level over ground (i.e. provides the overvoltage protection).

Optionally, the storage device includes a capacitor between an output of the boost circuit and ground.

The vehicle may be configured to provide 12 Volts and/or 24 Volts as power to the power supply unit. Optionally, the boost circuit is configured to amplify a voltage from the power supply unit to 50 Volts. The capacitance of the capacitor may have a capacitance in the range of 100-300 μF or about 220 μF.

Embodiments relate also to a method for providing a backup voltage for an electronic parking brake, EPB, of a commercial vehicle to ensure a safe state even during electric power failure of a power supply unit of the EPB. The method includes:

detecting, by a detection unit, the power failure;
storing, by a storage device, sufficient electric power to perform a switch into the safe state;
charging, by a boost circuit, the storage device during standstill of the vehicle and discharging the storage device during motion of the vehicle; and
supplying, by a switch device, the electric power of the storage device to the EPB if the power failure is detected by the detection unit.

This method or part thereof may also be implemented in software or a computer program product and the order of steps may not be important to achieve the desired effect. Therefore, embodiments relate also to a computer program having a program code for performing the method, when the computer program is executed on a processor.

Embodiments solve at least some of the above-mentioned problems by providing a backup power storage such as a capacitor that is implemented to store sufficient energy to actuate the solenoid valve(s) of the parking brake to switch within a short period of time (e.g. within 50 ms to 100 ms). The exemplary capacitor may be charged, or actively discharged, within milliseconds and the status of the capacitor may be provided to the main controller of the parking brake system. During standstill, the capacitor is charged and the capacitor is kept loaded. When the vehicle starts moving, the motion of the vehicle will be detected and, based thereon, the capacitor will be discharged to prevent any interference of the backup system during driving the vehicle.

Some examples of the systems and/or methods will be described in the following by way of examples only, and with respect to the accompanying figures.

DETAILED DESCRIPTION OF THE DRAWINGS

Figure 1:
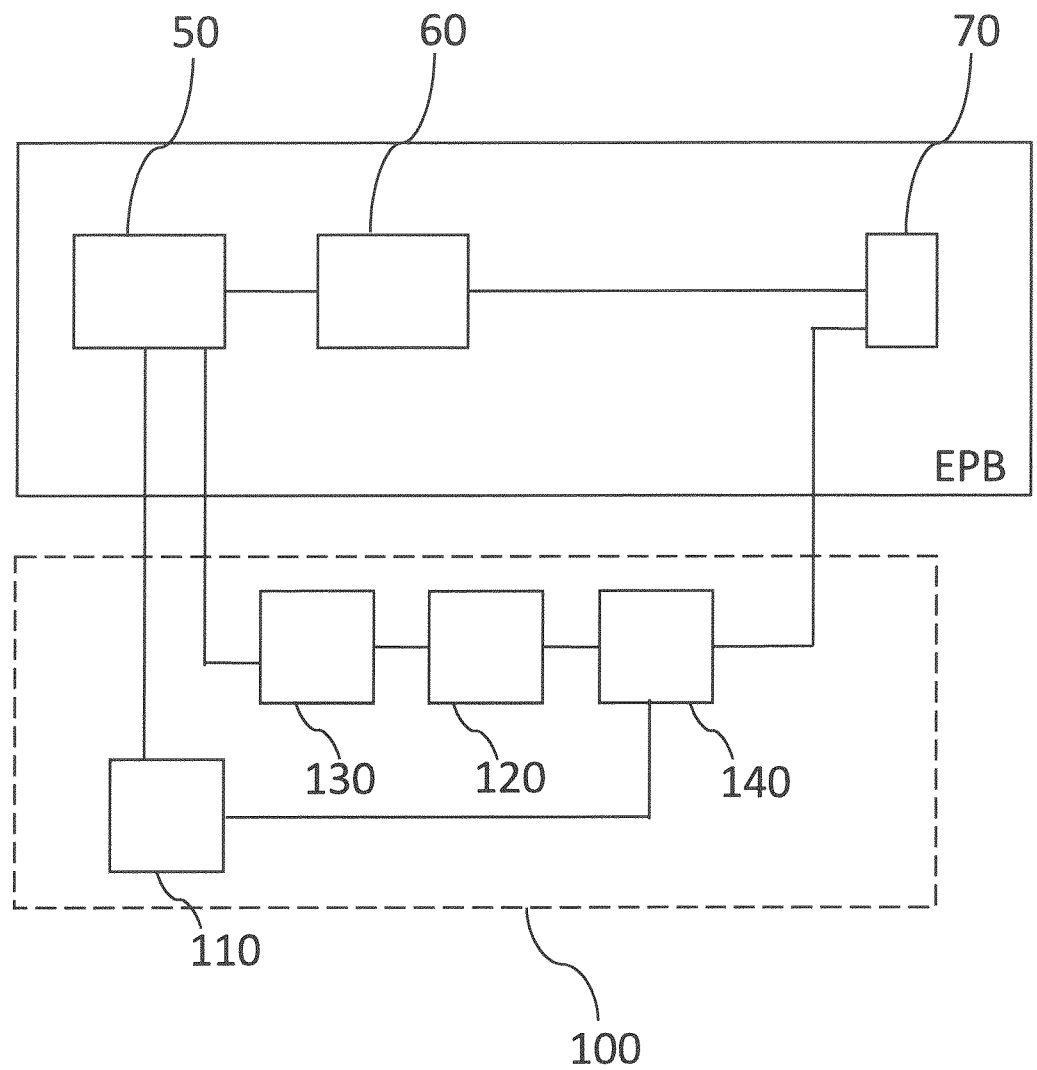
FIG. 1 depicts a backup system according to an embodiment.

FIG. 1 depicts a backup system 100 according to an embodiment. The backup system 100 is suitable or designed for an electronic parking brake, EPB, of a commercial vehicle which includes at least a power supply unit 50, a control unit 60, and at least one solenoid valve 70 configured to adjust a pneumatic pressure in the EPB based on control input from the control unit 60.

The backup system 100 is configured to ensure a safe state even during electric power failure of the power supply unit 50 of the EPB. The backup system 100 includes a detection unit 110, a storage device 120, a boost circuit 130, and a switch device 140. The detection unit 110 is adapted to detect the power failure. The storage device 120 is adapted to store sufficient electric power to perform a switch into the safe state. The boost circuit 130 is adapted to charge the storage device 120 during standstill of the vehicle and to discharge the storage device 120 during motion of the vehicle. The switch device 140 is configured to supply the electric power of the storage device 120 to the EPB if the power failure is detected by the detection unit 110.

The capacitance of the storage device 120 is selected based on the needed energy to activate the at least one solenoid valve 70 at least once. In addition, the storage device 120 may use one or more capacitor(s), because they may be charged and discharged quickly. For example, simulations have shown that a solenoid has a possible activation time of within 100 microseconds (or less), which is in real situations sufficient.

Figure 2:
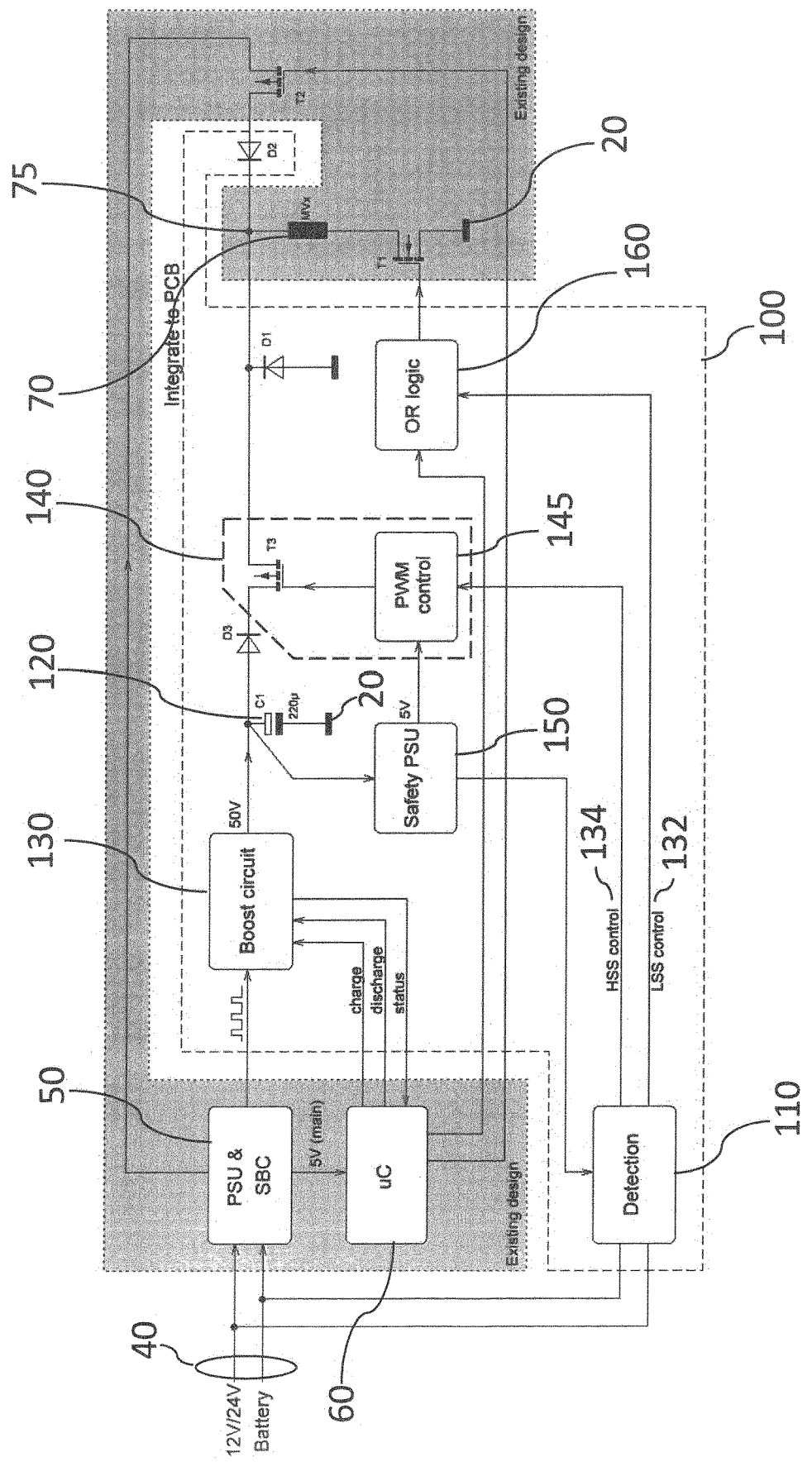
FIG. 2 depicts further details of the backup system according to further embodiments.

FIG. 2 depicts further details of the backup system 100 according to further embodiments. The vehicle may provide a dual power support from the battery 40, e.g. 12 Volts and/or 24 Volts. The parking brake includes the power supply unit 50 (PSU), the control unit at least one solenoid valve 70, a high side switch T2 and a low side switch T1. The low side switch T1 controls the current path from the at least one solenoid valve 70 to ground 20, whereas the high side switch T2 controls the current path between the power supply unit 50 and the solenoid valve 70. The power supply unit 50 may provide power (e.g. 5 Volts) for the control unit 60 and to the high side switch T2 (e.g. the high voltage power). The power supply may include a power converter such as an SBC (system basic chip) to convert the exemplary battery power (e.g. 12V or 24V) to an operation power (e.g. 5V). The control unit 60 is configured to control the low side switch T1 and the high side switch T2 to switch the solenoid valve 70.

The term "high voltage" refers to voltages provided by the power supply 50 or the battery as compared to ground 20, which can be any reference potential and represents to "low voltage". The term "high" refers therefore to the large difference compared to ground whether or not it is a positive or a negative voltage.

The backup system 100 is implemented in or added to a conventional EPB (indicated as existing design) and provides backup power to ensure a correct function of the at least one solenoid valve 70. Besides the detection unit 110, the storage device 120, the boost circuit 130, and the switch device 140, the backup system 100 according to this embodiment includes further components. The detection unit 110 is again configured to detect a power failure from the power supply 50 (e.g. by monitoring the battery supply 40). The power failure triggers a generation of corresponding control signals such as a high-side switch control signal 135 and/or a low side switch control signal 132.

The boost circuit 130 is configured to receive electric power from the power supply unit 50. This supply of power may involve a pulsed signal transmitted to the boost circuit 130 where it may be converted to a sufficiently high power, for example 50 Volts, utilized to charge the storage device 120 being arranged at the power output of the boost circuit

130. The output voltage of the boost circuit 130 may be selected such that a desired charge time of the storage device 120 can be ensured (e.g. less than a second or less than 500 ms).

The storage device 120 may be a capacitor and is arranged between ground 20 and the output of the boost circuit 130. The storage device 120 provides the electric power to the switch device 140 which is configured to connect/disconnect a current path from the storage device 120 to the solenoid valve 70. The capacitance of the exemplary capacitor 120 may be in the range between 100 µF and 400 µF, or about 100 µF or about 220 µF. The concrete value of the capacitance depends on the energy needed to securely actuate the at least one solenoid valve 70. For the charging, a pulsed voltage supply can be used enabling a sufficiently fast charging of the exemplary capacitor 120.

The switch device 140 includes a control circuit 145 and a backup switch T3. The control circuit 145 is configured to receive the high side switch control signal 134 from the detection unit 110 and, in response thereto, is configured to switch the backup switch T3 to provide the backup energy of the storage device 120 to the solenoid 70, concretely to a high voltage node 75 (may also be denoted as high side node) to which also the high side switch T2 couples. The backup switch T3 is thus configured to act as a backup for the high side switch T2. The control circuit 145 may provide a pulse width modulated (PWM-) signal for switching the backup switch T3.

The backup system 100 may further include a logic circuit 160 (e.g. OR gate) configured to receive a control signal from the control unit 60 for controlling the low side switch T1 and, in addition, the low side switch control signal 132 of the detection unit 110. The logic circuit 60 provides as output a control signal of the low side switch T1. Therefore, according to embodiments, whenever the logic circuit 160 receives a control signal from the control unit 60 and/or from the detection unit 110 the logic circuit 60 provides as output signal a switching signal to the low side switch T1.

The backup system 100 may further include a safety power supply unit 150 which can be charged with the electric power provided by the boost circuit 130 and/or from the storage device 120. The safety power supply unit 150 may be configured to provide a voltage conversion so that the switch device 140 can receive an appropriate input voltage (for example 5 Volts). Furthermore, the safety power supply unit 150 may provide a voltage supply to the detection unit 110. Therefore, even if a power failure occurs, the safety power supply unit 150 can provide electric power to the control circuit 145 and/or to the detection unit 110 to ensure the operation even if the main power supply unit 50 is not able to provide power. This additional power consumption is, according to further embodiments, considered when selecting the capacitance of the storage device 120.

The backup system 100, according to further embodiments, includes at least three diodes. A first diode D1 is configured to prevent an overvoltage at the high voltage node 75 for the solenoid valve 70 and may be operated in reverse bias (blocking direction) towards ground 20 so that the voltage at the high voltage node cannot exceed the breakthrough voltage of the first diode D1. A second diode D2 may be configured to act as a rectifier between the high voltage node 75 and the high side switch T2 and may, e.g. in the case of power failure, block any current from high voltage node 75 to the high side switch T2 and back to the power supply unit 50. A third diode D3 may be arranged between the storage device 120 and the switching device 140 and prevents any electric current flowing backwards from the switching device 140 to the storage device 120, but allows the current being provided from the storage device 120 to the switching device 140.

According to further embodiments, the boost circuit 130 is controlled by the control unit 60. For example, the control unit 60 may receive signals defining the motion state of the vehicle so that during standstill the boost circuit 130 can be controlled to charge the storage device 120. Furthermore, when the control unit 60 detects a moving state of the vehicle (for example with a predetermined velocity exceeding 7 km/h) the boost circuit 130 may be controlled to discharge the storage device 120. Finally, the boost circuit 130 may provide one or more status signals to the control unit 60 so that the control unit 60 is aware of the current status of the storage device 120 (whether it is charged or not). The information exchanged between the control unit 60 and the boost circuit 130 is provided by exchanging corresponding signals along the lines as indicated in FIG. 2.

According to further embodiments, the backup system 100 may be integrated into a printed circuit board, which may be already available and may comprise one or more electronic components of the EPB such as the control unit 60, the power supply unit 50, the low/high side switches T1, T2.

The functioning of embodiments for the backup system 100 can be described as follows. If a battery loss is detected, the solenoid 70 of the parking brake can be actuated or finalized using the stored energy of the storage device 120. This leads to an activation or a finishing of an actuation of the parking brake to the safe park-state. According to embodiments, this action will be performed only in a standstill status of the vehicle. In other words, during a motion state of the vehicle, no energy will be stored in the energy storage 120. It may be actively discharged if a predefined speed of the vehicle is exceeded (e.g. 5 km/h or 7 km/h). The charging of the storage device 120 will be performed automatically if the vehicle is at standstill (speed is about zero) or the speed is below a certain speed (e.g. the predefined speed).

This will ensure that during driving the inflated park brake chamber cannot be deflated or not be altered by external excitation such as a concrete driver request or vehicle request.

At standstill, the preferred safe state is the safe park state. Any intermediate position between park and drive state is denoted as gradually released park brake. Embodiments avoid unwanted intermediate position at standstill. The backup system 100 ensures that the park brake can always be switched into the safe park state—even in case of a battery loss occurs during a standstill of the vehicle.

Although the gradually released park brake is a feature that is utilized for preparing to start moving the vehicle and can last for minutes until the takeoff is finally requested. However, embodiments ensure—even for this situation—that the park brake can always be re-applied in the safe state, i.e. the solenoid valves can always be actuated. As long as the main power is available, this should not be a problem. When a power loss happens, the backup system 100 ensures that the actuation can take place automatically, e.g. without further interaction of the control unit 60 of the parking brake, which may not be available at power loss.

Figure 3:
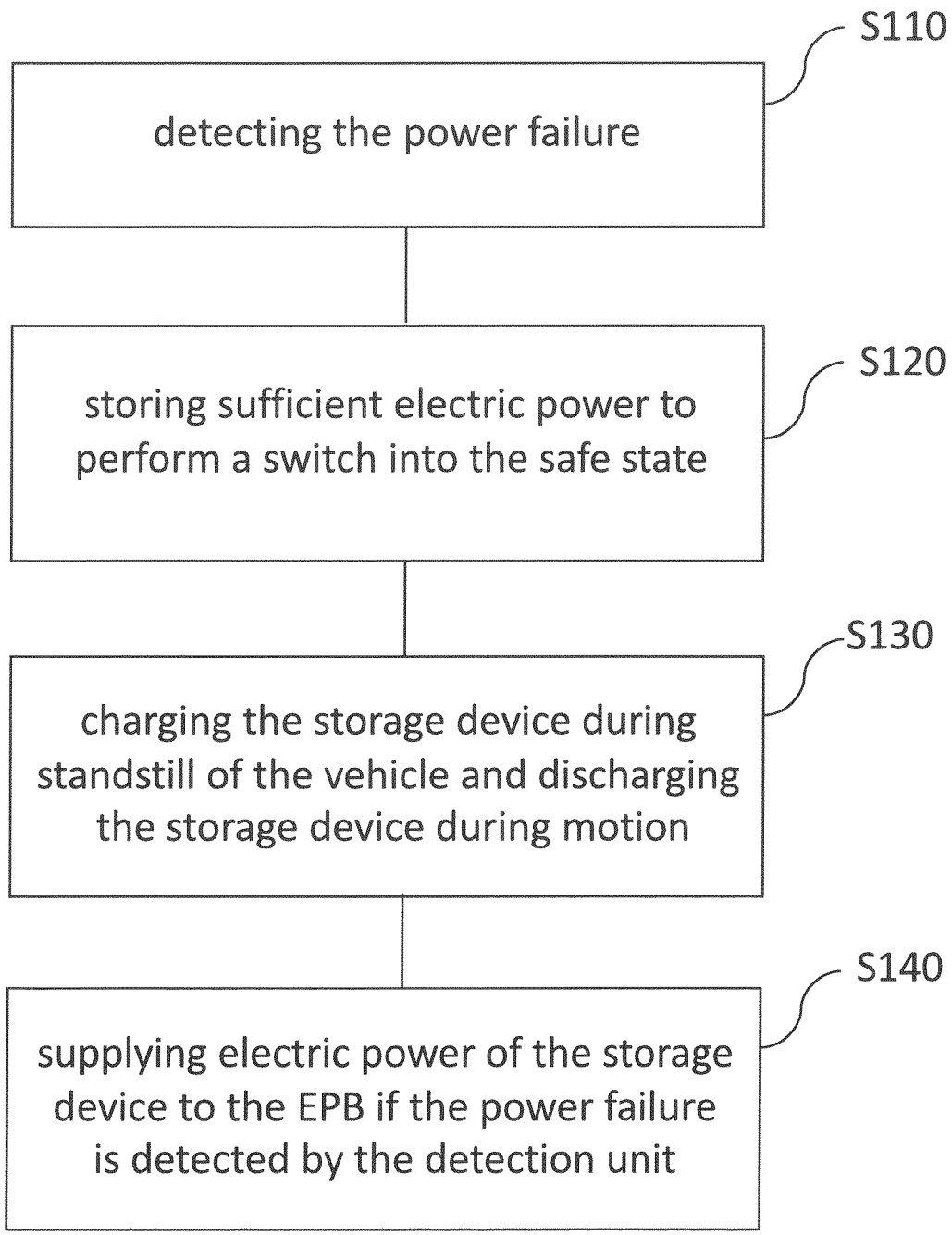
FIG. 3 is a schematical flow chart for a method of providing backup power according to yet another embodiment.
Figure 4:
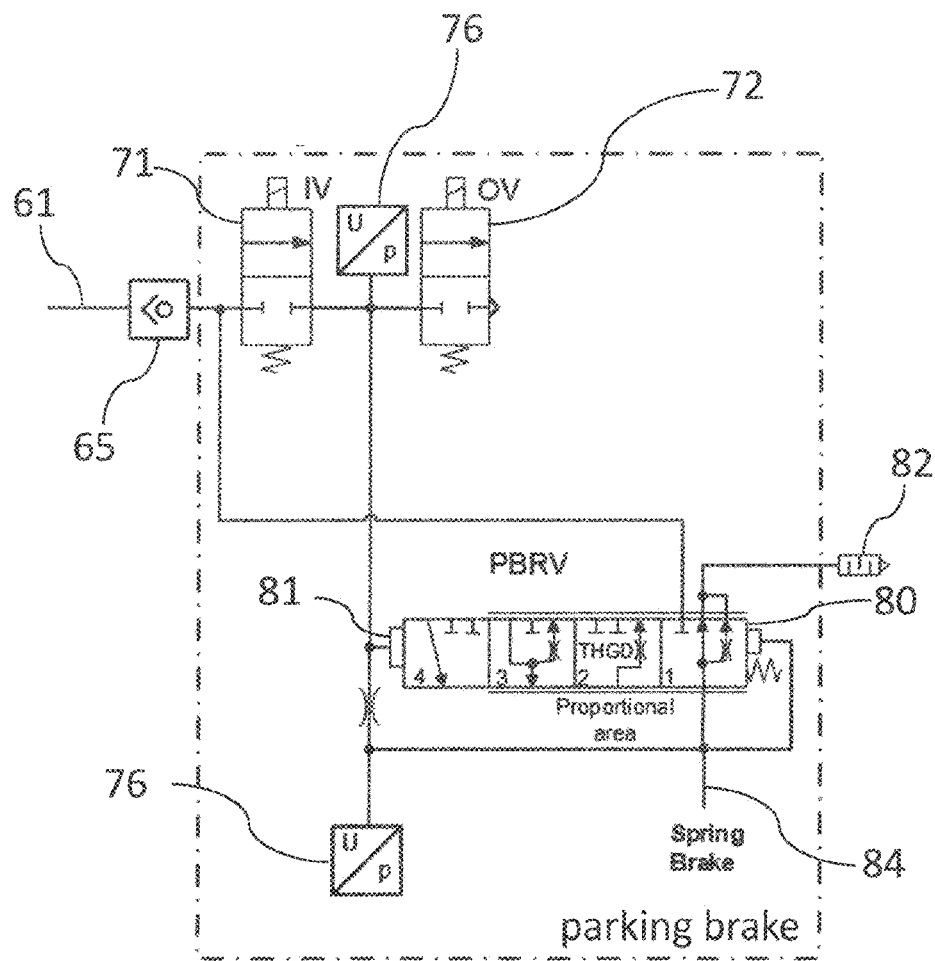
FIG. 4 depicts a conventional electronic parking brake of a commercial vehicle.

FIG. 3 illustrates a schematic flowchart for a method of providing backup power according to further embodiments. The method includes the steps of:

detecting S110 the power failure;
    storing S120 sufficient electric power to perform a switch into the safe state;

charging S130 the storage device 120 during standstill of the vehicle and to discharge the storage device 120 during motion of the vehicle; and supplying S140 the electric power of the storage device 120 to the EPB if the power failure is detected by the detection unit 110.

It is understood that all functions described in conjunction with the system 100 may be implemented as further optional method steps.

This method may also be a computer-implemented method. A person of skill in the art would readily recognize that steps of various above-described methods may be performed by programmed computers. Embodiments are also intended to cover non-transitory program storage devices, e.g., digital data storage media, which are machine or computer readable and encode machine-executable or computer-executable programs of instructions, wherein the instructions perform some or all of the acts of the above-described methods, when executed on the computer or processor.

According to further embodiments, the exemplary capacitor 120 is configured to provide (e.g. during the power failure) a continuous power supply so that no power drop occurs at the high voltage node 75. This may ensure the desired actuation of the solenoid valve 70. It is understood that this system is not only able to switch a single solenoid valve 70 but may be used to switch several solenoid valves, as for example the input valve 71 or the output valve 72 in the conventional electronic parking brake system as depicted in FIG. 3.

In summary, embodiments provide a mechanism that is in place to detect a (dual) power loss of the vehicle. The storage device 120 stores electric energy, for example in a capacitor, and is able to activate a solenoid 70 if a power loss is detected, for example in the double power supply input. The energy or the capacitance of the exemplary capacitor 120 is sufficiently high to perform the dedicated switching of the solenoid 70 in one of the safe states. In any event, the dedicated solenoid actuation shall be finalized to reach one of the bistable states.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS 20 ground (reference potential)
40 vehicle (dual) power supply (e.g. Battery)
50 power supply unit (PSU)
60 control unit
61 compressed air supply
65 check valve
70,71,72 at least one solenoid valve
75 high voltage node or high side node
76 pressure sensor(s)
80 relay valve
81 control input of relay valve
82 exhaust
84 outlet of EPB to spring chamber
100 backup system
110 detection unit
120 storage device
130 boost circuit
132, 134 control signals
140 switch device
145 control circuit
T1, T2, T3 switches (e.g. transistors)
D1, D2, D3 diodes

The invention claimed is:

1. A backup system for an electronic parking brake (EPB) of a commercial vehicle for ensuring a safe state even during electric power failure of a power supply unit of the EPB, comprising:
a detection unit for detecting the power failure;
a storage device for storing sufficient electric power to perform a switch into the safe state;
a boost circuit configured to charge the storage device during standstill of the vehicle and to discharge the storage device during motion of the vehicle; and
a switch device configured to supply the electric power of the storage device to the EPB when the power failure is detected by the detection unit.

2. The system according to claim 1, wherein the EPB comprises a control unit, a relay valve and at least one solenoid valve controlled by the control unit, the at least one solenoid valve controlling a pressure in the relay valve,
wherein
the boost circuit is configured to perform one or more of:
receiving, from the control unit, control signals indicating a standstill and/or a motion state of the vehicle,
providing a status signal to the control unit indicating a charge status of the storage device, or
receiving and/or amplifying a power from the power supply unit to charge the storage device in less than a second,
wherein the stored electric energy in the storage device is provided for an actuation of the at least one solenoid valve.

3. The system according to claim 2, wherein the EPB further comprises a high side switch configured to switch the at least one solenoid,
wherein
the switch device includes a backup switch and a control circuit,
wherein the backup switch is configured to open or to close a current path from the storage device to the at least one solenoid valve, and
wherein the control circuit is configured to control the backup switch and thus the power supply from the storage device to the at least one solenoid valve in case the power failure is detected.

4. The system according to claim 3, wherein
the detection unit is configured to provide a high side switch control signal to the switch device to enable, in case of the power failure, switching the backup switch.

5. The system according to claim 3, wherein
the at least one solenoid valve is arranged between a high side node and ground, and
the system further comprises at least one of:
a first diode configured to provide an overvoltage protection at the high side node,
a second diode configured to prevent a back current from the high side node to the high side switch, or a third diode configured to prevent a current flow from the backup switch to the storage device.

6. The system according to claim 2, wherein the EPB further comprises a low side switch to switch a connection of the at least one solenoid valve to ground, the control unit being configured to control the low side switch by a switch signal and the detection unit being configured to control the low side switch by a low side switch control signal, wherein a logic circuit is configured to switch the low-side switch when the control unit provides the switch signal or the detection unit provides the low side switch control signal.

7. The system according to claim 1, further comprising:
a safety power supply unit configured to be charged by the storage device and/or by the boost circuit, and to provide a backup power supply for the detection unit and/or for the switch device.

8. The system according to claim 1, wherein
the storage device includes a capacitor between an output of the boost circuit and ground.

9. The system according to claim 8, wherein
the vehicle is configured to provide 12 Volts and/or 24 Volts as power to the power supply unit,
the boost circuit is configured to amplify a voltage from the power supply unit to 50 Volts, and/or
the capacitance of the capacitor has a capacitance in the range of 100-300 µF or about 220 µF.

10. A method for providing a backup voltage for an electronic parking brake (EPB) of a commercial vehicle for ensuring a safe state even during electric power failure of a power supply unit of the EPB, the method comprising:
detecting, by a detection unit, the power failure;
storing, by a storage device, sufficient electric power to perform a switch into the safe state;
charging, by a boost circuit, the storage device during standstill of the vehicle and discharging the storage device during motion of the vehicle; and
supplying, by a switch device, the electric power of the storage device to the EPB when the power failure is detected by the detection unit.

11. A computer product comprising a non-transitory computer readable medium having stored thereon program code which, when executed on a processor, causes the acts of:
detecting, by a detection unit, a power failure;
storing, by a storage device, sufficient electric power to perform a switch into a safe state;
charging, by a boost circuit, the storage device during standstill of the vehicle and discharging the storage device during motion of the vehicle; and
supplying, by a switch device, the electric power of the storage device to an electronic parking brake (EPB) when the power failure is detected by the detection unit.

* * * * *